US010452037B2

(12) United States Patent
Hunt et al.

(10) Patent No.: US 10,452,037 B2
(45) Date of Patent: Oct. 22, 2019

(54) APPARATUS, METHOD, AND PROGRAM PRODUCT FOR CONTROLLING APPLIANCES

(71) Applicant: LENOVO (Singapore) PTE. LTD., New Tech Park (SG)

(72) Inventors: James Anthony Hunt, Chapel Hill, NC (US); Scott Edwards Kelso, Cary, NC (US); John Carl Mese, Cary, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 353 days.

(21) Appl. No.: 15/085,810

(22) Filed: Mar. 30, 2016

(65) Prior Publication Data
US 2017/0288892 A1  Oct. 5, 2017

(51) Int. Cl.
H04L 12/28 (2006.01)
G05B 15/02 (2006.01)

(52) U.S. Cl.
CPC ......... *G05B 15/02* (2013.01); *H04L 12/2825* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 2005/0171645 A1* | 8/2005 | Oswald | ............... | G05B 15/02 700/276 |
| 2007/0043477 A1* | 2/2007 | Ehlers | ............... | G06Q 10/10 700/276 |
| 2009/0072954 A1* | 3/2009 | Kim | ............... | H04B 3/54 375/285 |
| 2010/0082174 A1* | 4/2010 | Weaver | ............... | H02J 3/14 700/295 |
| 2011/0321105 A1* | 12/2011 | Ogle | ............... | H04N 21/2143 725/98 |
| 2012/0065789 A1* | 3/2012 | Scelzi | ............... | G01K 17/20 700/291 |
| 2014/0222210 A1* | 8/2014 | Agarwal | ............... | G05B 15/02 700/275 |
| 2016/0021596 A1* | 1/2016 | Hui | ............... | H04W 40/04 370/329 |

(Continued)

OTHER PUBLICATIONS

'Energy Consumption of Major Household Appliances' National Resources Canada, 2009.*

(Continued)

*Primary Examiner* — Bernard G Lindsay
(74) *Attorney, Agent, or Firm* — Kunzler Bean & Adamson

(57) ABSTRACT

Apparatuses, methods, and program products are disclosed for controlling appliances. One apparatus includes a processor, and a memory that stores code executable by the processor. The code is executable by the processor to detect a usage history of multiple types of appliances in a building. The code is executable by the processor to determine changes to operation of the multiple types of appliances based on the usage history. The code is executable by the processor to control the multiple types of appliances based on the determined changes to the operation of the multiple types of appliances.

24 Claims, 7 Drawing Sheets

(56) References Cited

U.S. PATENT DOCUMENTS

2016/0228640 A1* 8/2016 Pindado ............. A61N 1/36139
2017/0082994 A1* 3/2017 Gu ....................... G05B 19/048
2018/0239311 A1* 8/2018 Haslett .................. G06Q 10/04

OTHER PUBLICATIONS

'Care and Handling of CDs and DVDs', Fred. R. Byers, NIST, 2003.*
Lee et al. 'Occupancy Prediction Algorithms for Thermostat Control Systems Using Mobile Devices' IEEE Transactions on Smart Grid, vol. 4, No. 3, Sep. 2013.*

* cited by examiner

APPARATUS, METHOD, AND PROGRAM PRODUCT FOR CONTROLLING APPLIANCES

BACKGROUND

Field

The subject matter disclosed herein relates to appliances and more particularly relates to controlling appliances.

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for multiple purposes. For example, information handling devices may be used to communicate with other devices.

BRIEF SUMMARY

An apparatus for controlling appliances is disclosed. A method and computer program product also perform the functions of the apparatus. In one embodiment, the apparatus includes a processor, and a memory that stores code executable by the processor. The code, in various embodiments, is executable by the processor to detect a usage history of multiple types of appliances in a building. In a further embodiment, the code is executable by the processor to determine changes to operation of the multiple types of appliances based on the usage history. The code, in some embodiments, is executable by the processor to control the multiple types of appliances based on the determined changes to the operation of the multiple types of appliances.

In another embodiment, the code executable by the processor detects the usage history of the multiple types of appliances in a building by receiving data from each type of appliance of the multiple types of appliances. In some embodiments, the code executable by the processor determines the changes to the operation of the multiple types of appliances based on the usage history to reduce energy consumption. In various embodiments, the code executable by the processor determines the changes to the operation of the multiple types of appliances based on user preferences. In certain embodiments, the code executable by the processor detects a number of people in the building and determines a correlation between the usage history of the multiple types of appliances in the building and the number of people in the building.

A method for controlling appliances, in one embodiment, includes detecting, by use of a processor, a usage history of multiple types of appliances in a building. In some embodiments, the method includes determining changes to operation of the multiple types of appliances based on the usage history. In a further embodiment, the method includes controlling the multiple types of appliances based on the determined changes to the operation of the multiple types of appliances.

In some embodiments, detecting the usage history of the multiple types of appliances in the building includes receiving data from each type of appliance of the multiple types of appliances. In various embodiments, receiving data from each type of appliance includes receiving data selected from the group including power on data, power off data, energy consumption data, settings data, zone operational data, and temperature data. In one embodiment, detecting the usage history of the multiple types of appliances includes detecting the usage history of types of appliances selected from the group including a refrigerator, an air conditioner, a heater, a water heater, a lighting fixture, an irrigation system, a microwave, an oven, a stove, a dishwasher, a washing machine, a dryer, a garage door opener, a television, a computer, and a small kitchen appliance.

In some embodiments, determining the changes to the operation of the multiple types of appliances based on the usage history includes determining to perform functions selected from the group including turning on, turning off, turning on a subassembly, turning off a subassembly, adjusting a temperature, adjusting a setting, and adjusting an amount of power used. In certain embodiments, determining the changes to the operation of the multiple types of appliances based on the usage history includes determining the changes to the operation of the multiple types of appliances based on the usage history to reduce energy consumption. In one embodiment, determining the changes to the operation of the multiple types of appliances based on the usage history includes determining the changes to the operation of the multiple types of appliances based on user preferences. In some embodiments, determining the changes to the operation of the multiple types of appliances based on the usage history includes using an energy rate schedule to determine the changes to the operation of the multiple types of appliances. In such embodiments, the method may include dynamically obtaining the energy rate schedule.

In certain embodiments, controlling the multiple types of appliances based on the determined changes to the operation of the multiple types of appliances includes directing the multiple types of appliances to perform functions selected from the group including turning on, turning off, turning on a subassembly, turning off a subassembly, adjusting a temperature, adjusting a setting, and adjusting an amount of power used. In one embodiment, the method includes detecting a number of people in the building and determining a correlation between the usage history of the multiple types of appliances in the building and the number of people in the building. In such embodiments, determining the changes to the operation of the multiple types of appliances based on the usage history includes determining the changes to the operation of the multiple types of appliances based on the correlation between the usage history of the multiple types of appliances in the building and the number of people in the building.

In some embodiments, the method includes detecting locations of people in the building and determining a correlation between the usage history of the multiple types of appliances in the building and the locations of the people in the building. In certain embodiments, determining the changes to the operation of the multiple types of appliances based on the usage history includes determining the changes to the operation of the multiple types of appliances based on the correlation between the usage history of the multiple types of appliances in the building and the locations of the people in the building. In various embodiments, detecting the locations of the people in the building includes detecting the locations of the people in the building using at least one sensor selected from the group including a motion detector, a camera, a mobile phone, an activity tracker, and an information handling device.

In one embodiment, the method includes detecting an environmental factor associated with a person in the building and determining the changes to the operation of the multiple type of appliances based on the environmental factor. In such an embodiment, detecting the environmental factor associated with the person includes detecting a temperature associated with the person. In certain embodiments, detecting the temperature associated with the person includes detecting the temperature associated with the person by receiving data from an information handling device worn by the person. In some embodiments, detecting the temperature associated with the person includes detecting the temperature associated with the person by receiving data from an information handling device that detects an ambient room temperature and/or an outside temperature. In various embodiments, detecting the temperature associated with the person includes detecting the temperature associated with the person by receiving data from a weather service, such as a weather service accessible using a network (e.g., a web site).

In one embodiment, a program product includes a computer readable storage medium that stores code executable by a processor. The executable code, in certain embodiments, includes code to perform detecting a usage history of multiple types of appliances in a building. In a further embodiment, the executable code includes code to perform determining changes to operation of the multiple types of appliances based on the usage history. The executable code, in some embodiments, includes code to perform controlling the multiple types of appliances based on the determined changes to the operation of the multiple types of appliances.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
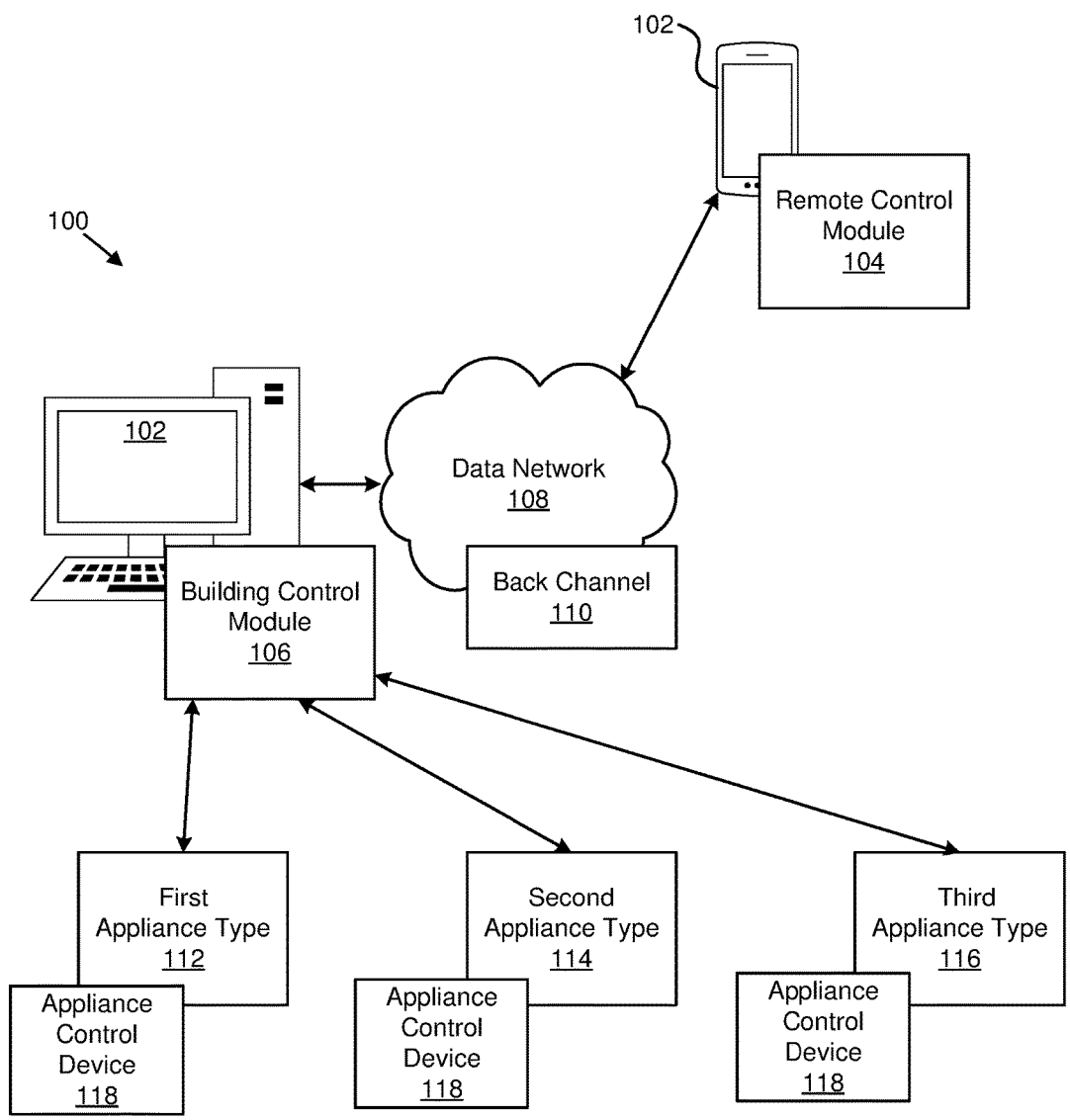
FIG. 1 is a schematic block diagram illustrating one embodiment of a system for controlling appliances.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for controlling appliances. In one embodiment, the system 100 includes information handling devices 102, remote control modules 104, building control modules 106, and data networks 108. Even though a specific number of information handling devices 102, remote control modules 104, building control modules 106, and data networks 108 are depicted in FIG. 1, one of skill in the art will recognize that any number of information handling devices 102, remote control modules 104, building control modules 106, and data networks 108 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), control devices, cellular devices, wireless devices, or the like. In some embodiments, the information handling devices 102 include wearable devices, such as smart watches, fitness bands, optical head-mounted displays, or the like. The information handling devices 102 may access the data network 108 directly using a network connection (e.g., wired connection, wired connection, cellular connection, etc.).

The information handling devices 102 may include an embodiment of the remote control module 104 that may be part of a single software application. In certain embodiments, the remote control module 104 may configure various settings for multiple different types of appliances. The remote control module 104 may make various setting decisions for the multiple types of appliances based on a location of the information handling device 102 that includes the remote control module 104. The remote control module 104 may also transmit control data for controlling the multiple types of appliances. In this manner, the remote control module 104 may be used to remotely control multiple different types of appliances using a single software application.

The information handling devices 102 may include an embodiment of the building control module 106. In certain embodiments, the building control module 106 may receive control data from an application (e.g., a software application that includes the remote control module 104). In some embodiments, the control data corresponds to multiple different appliance types. The building control module 106 may control a first appliance type of the multiple appliance types as a direct result of receiving the control data. The building control module 106 may also control a second appliance type of the multiple appliance types as a direct result of receiving the control data. In various embodiments the first and second appliance types are different appliance types. In this manner, the building control module 106 may be used to control multiple different appliance types.

The data network 108, in one embodiment, includes a digital communication network that transmits digital communications. The data network 108 may include a wireless network, such as a wireless cellular network, a local wireless network, such as a Wi-Fi network, a Bluetooth® network, a near-field communication ("NFC") network, an ad hoc network, and/or the like. The data network 108 may include a WAN, a storage area network ("SAN"), a LAN, an optical fiber network, the internet, or other digital communication network. The data network 108 may include two or more networks. The data network 108 may include one or more servers, routers, switches, and/or other networking equipment. The data network 108 may also include computer readable storage media, such as a hard disk drive, an optical drive, non-volatile memory, RAM, or the like.

As illustrated, the data network 108 may include a back channel 110. In certain embodiments, the back channel 110 is a low bandwidth channel. For example, the back channel 110 may have a low bandwidth channel having a data rate of approximately 1 bit per second (bit/s), 10 bits/s, 100 bits/s, 1,000 bits/s, or 10,000 bits/s. In various embodiments, the back channel 110 may have a low bandwidth channel having a data rate less than approximately 1,000 bits/s or 10,000 bits/s. In some embodiments, the back channel 110 may have a data rate of greater than 10,000 bits/s.

In some embodiments, the back channel 110 is a low priority channel. For example, the back channel 110 may only be available if a certain percentage of network resources are available (e.g., 5%, 15%, 25%, 50%, 80%, 90%, etc.). In various embodiments, the back channel 110 operates only at predetermined times (e.g., not instantaneous). For example, the back channel 110 may operate only during non-peak time periods, such as only operating between 9:00 pm and 5:00 am, or during any other suitable time period. In one embodiment, the back channel 110 is a low cost service (e.g., 1%, 3%, 5%, 10%, 20%, 50% of standard service) with a cellular provider and is used to deliver low bandwidth data packets to a smart home control device (e.g., building control module 106). It should be noted that a smart home may be any home or building equipped with appliances that may be controlled remotely by an information handling device 102.

In certain embodiments, the back channel 110 uses wireless communication, while in other embodiments, the back channel 110 uses wired communication. For example, the back channel 110 may use wireless communication by using a cellular device or some other wireless communication device. As another example, the back channel 110 may use wired communication by communicating over a network, power lines, and/or telephone lines.

As illustrated, the building control module 106 may be used to control multiple appliance types. The multiple appliance types may include a first appliance type 112, a second appliance type 114, and/or a third appliance type 116. As may be appreciated, the appliance types may be any suitable type of appliance that is used at a building (e.g., a home, a residence, an apartment, a hotel, a motel, a condominium, an office building, a restaurant, a store, etc.). In certain embodiments, the appliance types may be any suitable type of appliance that is used within any enclosed structure, such as a vehicle (e.g., automobile, recreational vehicle, boat, ship, airplane, bus, train, subway, etc.). As sued herein, the term building may encompass any enclosed structure, such as any type of vehicle.

In certain embodiments, the appliance types may include a refrigerator, an air conditioner, a heater, a water heater, a lighting fixture, an irrigation system, a microwave, an oven, a stove, a dishwasher, a washing machine, a dryer, a garage door opener, a television, a computer, a fan (e.g., ceiling fan), a thermostat, a door lock, a sound system, an intercom, and a small kitchen appliance (e.g., toaster, blender, mixer, coffee maker, crock pot, etc.). It should be noted that an appliance may be any device or piece of equipment designed to perform a specific task, such as a domestic task.

Each appliance type includes an appliance control device 118. The appliance control device 118 interfaces with its corresponding appliance and may receive control signals (e.g., wired or wirelessly) for controlling operation of its corresponding appliance. For example, the appliance control device 118 may be used to perform a function such as turning on the appliance, turning off the appliance, turning on a portion (e.g., subassembly) of the appliance, turning off a portion of the appliance, adjusting a temperature controlled by the appliance, adjusting a setting of the appliance, and/or adjusting an amount of power used by the appliance.

Figure 2:
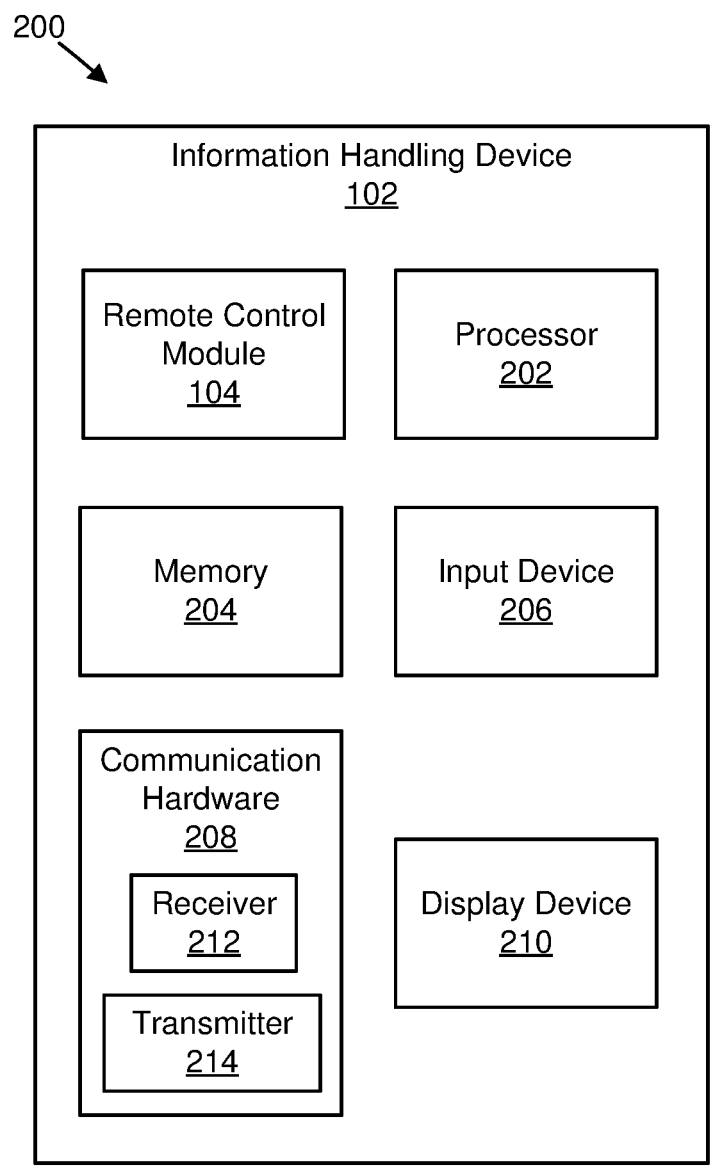
FIG. 2 is a schematic block diagram illustrating one embodiment of an apparatus including an information handling device.

FIG. 2 depicts one embodiment of an apparatus 200 that may be used for controlling appliances. The apparatus 200 includes one embodiment of the information handling device 102. Furthermore, the information handling device 102 may include the remote control module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the remote control module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to controlling appliances. In some embodiments, the memory 204 also stores program code and related data, such as an operating system or other controller algorithms operating on the information handling device 102.

The information handling device 102 may use the remote control module 104 for remotely controlling appliances. As may be appreciated, the remote control module 104 may include computer hardware, computer software, or a combination of both computer hardware and computer software. For example, the remote control module 104 may include circuitry, or a processor, used to configure appliances. As another example, the remote control module 104 may include computer program code that is used to configure appliances.

The input device 206, in one embodiment, may include any known computer input device including a touch panel, a button, a keyboard, a stylus, a microphone (e.g., for voice input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth. Furthermore, the communication hardware 208 includes a receiver 212 and a transmitter 214. The receiver 212 may be a wireless receiver, a cellular receiver, a Wi-Fi receiver, or any other suitable receiver. Moreover, the transmitter 214 may be a wireless transmitter, a cellular transmitter, a Wi-Fi transmitter, or any other suitable transmitter.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime) upon performance of a function. In some embodiments, the display device 210 includes one or more haptic devices for producing vibrations, motion, or other haptic feedback. For example, the display device 210 may produce haptic feedback upon performance of a function.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the remote control module 104.

Figure 3:
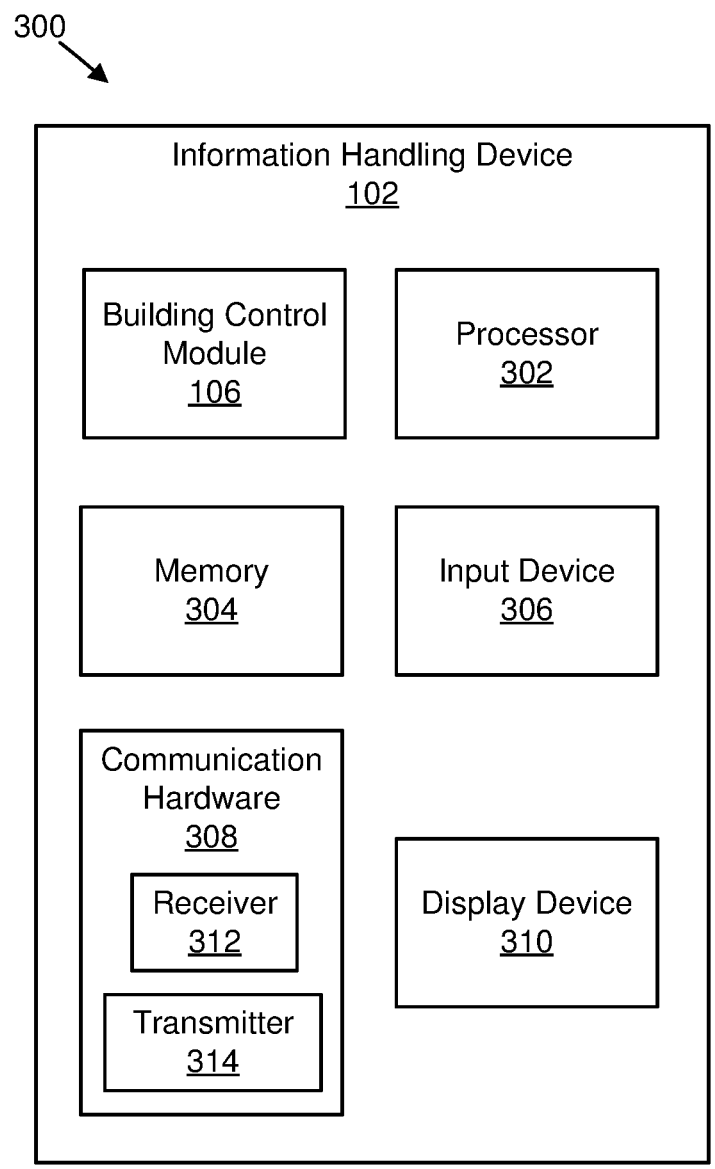
FIG. 3 is a schematic block diagram illustrating another embodiment of an apparatus including an information handling device.

FIG. 3 depicts another embodiment of an apparatus 300 that may be used to control appliances. The apparatus 300 includes one embodiment of the information handling device 102. Furthermore, the information handling device 102 may include the building control module 106, a processor 302, a memory 304, an input device 306, communication hardware 308, a display device 310, a receiver 312, and a transmitter 314, that may be substantially similar to the processor 202, the memory 204, the input device 206, the communication hardware 208, the display device 210, the receiver 212, and the transmitter 214 described in relation to FIG. 2.

Figure 4:
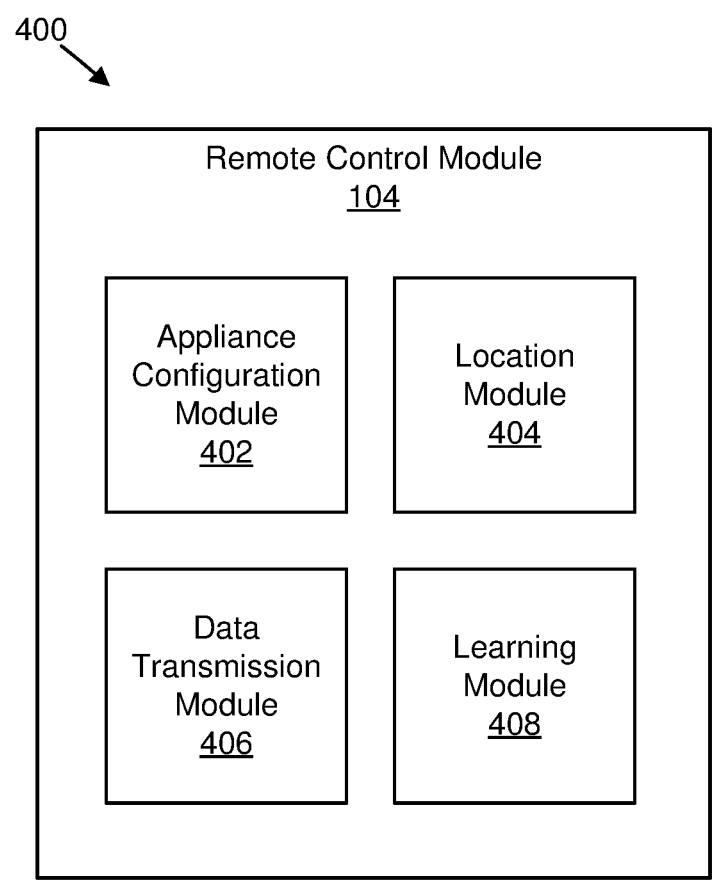
FIG. 4 is a schematic block diagram illustrating one embodiment of an apparatus including a remote control module.

FIG. 4 depicts a schematic block diagram illustrating one embodiment of an apparatus 400 that includes one embodiment of the remote control module 104. Furthermore, the remote control module 104 includes an appliance configuration module 402, a location module 404, a data transmission module 406, and a learning module 408.

In certain embodiments, the remote control module 104 may be used to provide control data used to control appliances. For example, the remote control module 104 may be used to change lighting patterns in a building to provide the illusion of the building being occupied even when the building is unoccupied. As another example, the remote control module 104 may be used to change heating and/or air conditioning settings based on whether a building is occupied or unoccupied. As a further example, the remote control module 104 may be used to change settings and/or power usage of any suitable appliance and/or appliance type (e.g., refrigerator, water heater, smart appliance) based on a schedule, a command, an occupied status, and so forth. Moreover, the remote control module 104 may also be used to change settings and/or power usage of any suitable appliance and/or appliance type at a desired time. For example, the remote control module 104 may be used to prepare a building for arrival of an individual, such as by adjusting a temperature in the building, turning on a water heater, turning on lights, scheduling a deliver, scheduling a grocery pickup (e.g., place an electronic order for groceries), schedule a restaurant take-out order (e.g., place an electronic order for a meal to be ready at a specific time), and so forth.

In various embodiments, the remote control module 104 may be used to control multiple smart homes. Moreover, the remote control module 104 may facilitate linking control of the multiple smart homes together. For example, if a first smart home is scheduled to be in an occupied state, a second smart home may be scheduled to be in an unoccupied state for that same time. In such an embodiment, the remote control module 104 may provide control data to both smart home to facilitate their synchronous control.

The appliance configuration module 402 may be used to configure multiple types of appliances. In certain embodiments, the appliance configuration module 402 may be used to configure multiple types of appliances within (e.g., using) a single software application. For example, in some embodiments, multiple types of appliances from a building may be configured from within a single software application.

In some embodiments, the multiple appliance types that may be configured may include a refrigerator, an air conditioner, a heater, a water heater, a lighting fixture, an irrigation system, a microwave, an oven, a stove, a dishwasher, a washing machine, a dryer, a garage door opener, a television, a computer, a fan (e.g., ceiling fan), a thermostat, a door lock, a sound system, an intercom, and/or one or more small kitchen appliances (e.g., toaster, blender, mixer, coffee maker, crock pot, etc.).

In various embodiments, the multiple appliance types may be configured by scheduling one or more of the following functions of the appliance: turning on, turning off, turning on a portion, turning off a portion, adjusting a temperature, adjusting a setting, and adjusting an amount of power used. In some embodiments, the appliance configuration module 402 may configure multiple types of appliances with a single command, such as indicating a setting that the multiple types of appliances are to be set to an occupied or "at home" state and/or indicating a setting that the multiple types of appliances are to be set to an unoccupied or "away" state.

In some embodiments, the location module 404 may be used to track a location of the apparatus 400 that includes the remote control module 104. The location of the apparatus 400 may be used, in certain embodiments, to automate control of different appliance types based on the location of the apparatus 400. For example, the location module 404 may dynamically indicate to the appliance configuration module 402 whether the multiple types of appliances are to be set to the occupied or "home" state and/or to the unoccupied or "away" state in response to the location module 404 determining the location of the apparatus 400. In certain embodiments, the location module 404 may be used to predict the location of the apparatus 400, thereby predicting an indication to be provided to the appliance configuration module 402 before the apparatus 400 leaves a building and/or arrives at a building. In various embodiments, the location module 404 may provide indications to the appliance configuration module 402 based on the location of the apparatus 400 within a building. In such embodiments, the appliance configuration module 402 may determine configurations for the multiple types of appliances based on the location of the apparatus 400 within the building (e.g., room of a house the apparatus 400 is in, row in a car the apparatus 400 is in, section of a train the apparatus 400 is in, seat of an airplane the apparatus 400 is in, etc.).

In one embodiment, the data transmission module 406 transmits control data to a control device that controls the multiple types of appliances to the configurations determined by the appliance configuration module 402. For example, in various embodiments, the data transmission module 406 transmits the control data to a control device used to control a building. In some embodiments, the data transmission module 406 transmits the control data to an apparatus that includes the building control module 106.

In certain embodiments, the data transmission module 406 transmits the control data at predetermined intervals, at a low bandwidth, at a low priority, and/or on a back channel such that a low amount of resources are used to transmit the control data as compared to standard cellular and/or network transmissions.

In some embodiments, the learning module 408 detects a usage history of multiple types of appliances in a building. In certain embodiments, the learning module 408 determines changes to operation of the multiple types of appliances based on the usage history. In various embodiments, the learning module 408 controls the multiple types of appliances based on the determined changes to the operation of the multiple types of appliances. Thus, the learning module 408 may learn how a person in a building uses their building and, based on the learning, increase comfort and/or improve energy use of the building.

Figure 5:
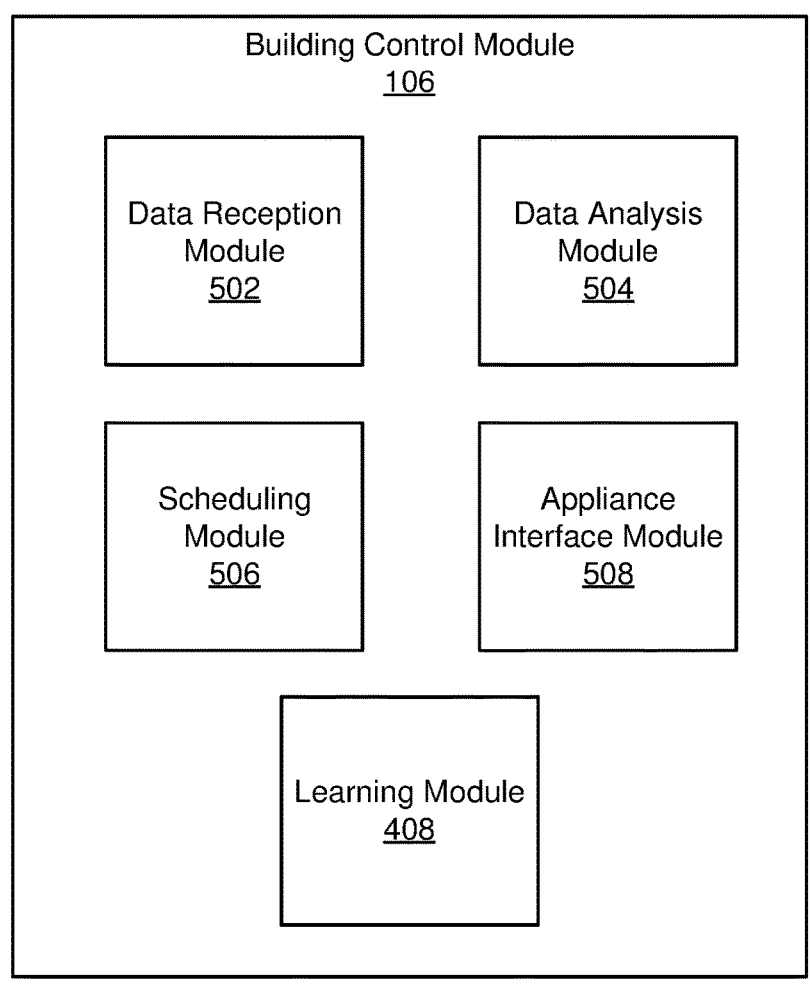
FIG. 5 is a schematic block diagram illustrating one embodiment of an apparatus including a building control module.

FIG. 5 is a schematic block diagram illustrating one embodiment of an apparatus 500 that includes one embodiment of the building control module 106. Furthermore, the building control module 106 includes the learning module 408 that may be substantially similar to the learning module 408 of the remote control module 104. The building control module 106 also includes a data reception module 502, a data analysis module 504, a scheduling module 506, and an appliance interface module 508.

In certain embodiments, the building control module 106 may be used to control appliances. For example, the building control module 106 may control a change in lighting patterns of a building to provide the illusion of the building being occupied even when the building is unoccupied. As another example, the building control module 106 may control a change to heating and/or air conditioning settings based on whether a building is occupied or unoccupied. As a further example, the building control module 106 may control a change to settings and/or power usage of any suitable appliance and/or appliance type based on a schedule, a command, an occupied status, and so forth. Moreover, the building control module 106 may control a change to settings and/or power usage of any suitable appliance and/or appliance type at a desired time. For example, the building control module 106 may control a building to prepare for arrival of an individual, such as by controlling an adjustment to a temperature in the building, turning on a water heater, turning on lights, scheduling a deliver, scheduling a grocery pickup, and so forth.

The data reception module 502 may receive control data from a software application, such as a software application that includes the remote control module 104. The control data, in certain embodiments, corresponds to multiple appliance types. In one embodiment, the data reception module 502 receives the control data wirelessly, such as via Wi-Fi or cellularly. In some embodiments, the data reception module 502 receives the control data via a wired connection. In such embodiments, the data reception module 502 may receive the control data via a network connection. In certain embodiments, the data reception module 502 may receive the control data via a back channel (e.g., the back channel 110). In one embodiment, the back channel is a low bandwidth cellular back channel; however, the back channel may be any suitable back channel. In some embodiments, the control data is received by the data reception module 502 at predetermined time intervals, such as during a scheduled time period or off-peak data usage periods.

In certain embodiments, the data reception module 502 receives control data to facilitate controlling multiple appliance types. In some embodiments, the multiple appliance types may include one or more of a refrigerator, an air conditioner, a heater, a water heater, a lighting fixture, an irrigation system, a microwave, an oven, a stove, a dishwasher, a washing machine, a dryer, a garage door opener, a television, a computer, a fan (e.g., ceiling fan), a thermostat, a door lock, a sound system, an intercom, and/or one or more small kitchen appliances (e.g., toaster, blender, mixer, coffee maker, crock pot, etc.).

In some embodiments, the data analysis module 504 analyzes the control data to determine actual commands and/or data to be provided to the appliances. For example, in one embodiment, the data analysis module 504 determines settings for each appliance type of the multiple appliance types based on the control data. In certain embodiments, the data analysis module 504 may receive control data that indicates that the building is unoccupied, occupied, about to be unoccupied, and/or about to be occupied. In such embodiments, the data analysis module 504 may determine what types of appliances and/or what appliances are to receive commands based on the indications. For example, if the building is unoccupied and/or about to be unoccupied, the data analysis module 504 may determine that certain types of appliances should be notified. As another example, if the building is occupied and/or about to be occupied, the data analysis module 504 may determine that certain types of appliances should be notified.

In one embodiment, the scheduling module 506 determines when appliances are to be controlled. For example, the control data may indicate that an event is to occur at a future time period. Accordingly, the scheduling module 506 may use the event information from the control data to schedule when affected appliances are to be controlled. In some embodiments, the scheduling module 506 may determine a schedule for controlling the first appliance type based on the control data.

In certain embodiments, the appliance interface module 508 controls appliances (e.g., multiple types of appliances) as a direct result of receiving the control data. For example, a first appliance type of the multiple appliance types may be controlled by the appliance interface module 508 as a direct result of receiving the control data. As another example, a second appliance type of the multiple appliance types may be controlled by the appliance interface module 508 as a direct result of receiving the control data.

In one embodiment, the appliance interface module 508 may direct an appliance to perform one or more functions such as turning on the appliance, turning off the appliance, turning off a portion of the appliance, turning on a portion of the appliance, adjusting a temperature of the appliance, adjusting a setting of the appliance, and adjusting an amount of power used by the appliance. In certain embodiments, the appliance interface module 508 may control an appliance at a time defined by the control data (e.g., as scheduled by the scheduling module 506). In various embodiments, the appliance interface module 508 may transmit data to an appliance control device electrically coupled to an appliance and/or an appliance type. For example, the appliance interface module 508 may transmit data directly to a lighting control device, a temperature control device, a power control device, a device control module, and so forth.

In some embodiments, the appliance interface module 508 may receive feedback from appliances. The feedback from the appliances may include any suitable feedback, such as temperatures, operational status, error codes, problems, and so forth. In such embodiments, the appliance interface module 508 may provide information to the data reception module 502 and/or the data analysis module 504 to determine any actions to be performed based on the feedback. Such actions based on the feedback may include providing an alert, providing feedback to the remote control module 104, controlling one or more appliances to fix the problem, placing an electronic order for a replacement part, and so forth.

Figure 6:
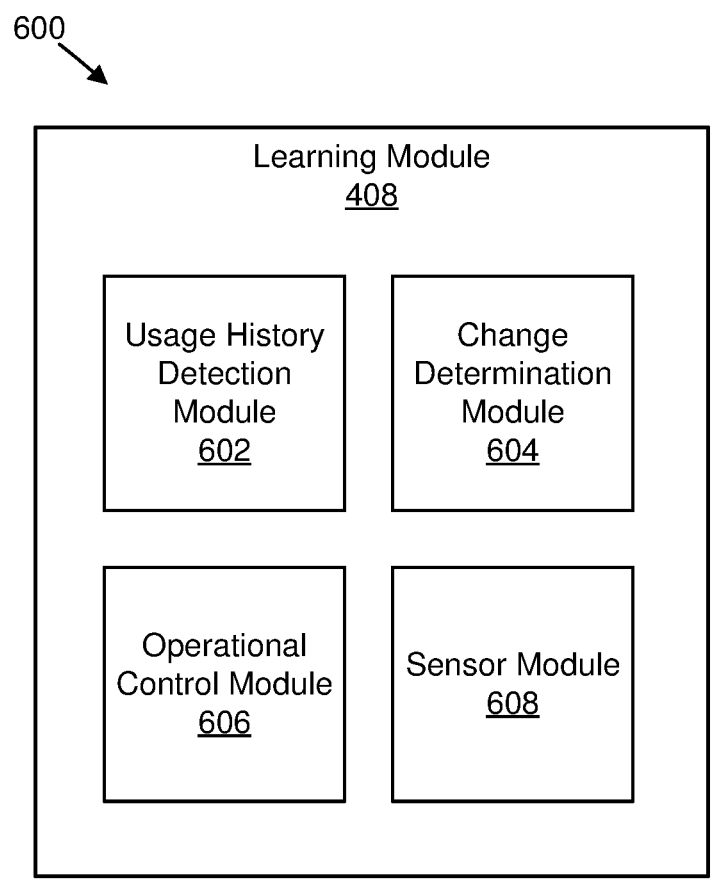
FIG. 6 is a schematic block diagram illustrating one embodiment of an apparatus including a learning module.

FIG. 6 is a schematic block diagram illustrating one embodiment of an apparatus 600 that includes one embodiment of the learning module 408. Furthermore, the learning module 408 also includes a usage history detection module 602, a change determination module 604, an operational control module 606, and a sensor module 608.

The learning module 408 may be used to learn how a person or people use a building and use the learned information to increase the comfort and/or improve energy use of the building. For example, the learning module 408 may gather information from appliances and/or information handling devices 102 and use the gathered information to determine patterns of people being at the building and/or not at the building, and to determine patterns of power use in the building. The learning module 408 may also learn the rate and cost of temperature changes for the building. In one embodiment, the learning module 408 may use learned information to determine a cost effective temperature for in building versus out of building cooling and/or heating. In another embodiment, the learning module 408 may use learned information to determine temperatures for in building versus out of building cooling and/or heating based on user preferences.

The learning module 408, in certain embodiments, may use information handling devices 102 to determine if a person or people are in the building or not in the building. In some embodiments, the learning module 408 may determine a cost to raise the temperature and/or lower the temperature. Using the determined cost, the learning module 408 may determine an ideal rate of temperature change. The learning module 408 may, in various embodiments, use learned information regarding costs to change temperature to control multiple cooling and/or heating units to work collectively to cool and/or heat the building.

In some embodiments, the learning module 408 may use multiple air conditioning units to quickly cool a room in the building and/or a section in the building. In certain embodiments, the learning module 408 may control (e.g., program) an air conditioning system to temporarily redirect air flow to quickly cool a room in the building and/or a section in the building.

In some embodiments, the learning module 408 may use multiple heating units to quickly heat a room in the building and/or a section in the building. In certain embodiments, the learning module 408 may control (e.g., program) a heating unit to temporarily redirect air flow to quickly heat a room in the building and/or a section in the building. As may be appreciated, the learning module 408 may control the quick heating and/or cooling to use a minimum amount of power.

In various embodiments, the learning module 408 may create vacation schedules and/or daily plans based on the learned use of the building. Furthermore, the learning module 408 may turn on and/or turn off schedules and plans based on learned behaviors. In certain embodiments, the learning module 408 may control appliances based on a location of a person within a certain portion of a building, such as a person in a room of a building.

For example, a person may perform a specific function (e.g., exercise, work, play) in a room of a building and the person may desire that the room has a certain temperature (e.g., warmer, cooler) while the person is in the room. Accordingly, the learning module 408 may adjust the temperature of the room in the building when the learning module 408 detects that the person is in the room. In one embodiment, the learning module 408 may adjust the temperature of the room when the learning module 408 detects that the person is moving towards the room. In a further embodiment, the learning module 408 may adjust the temperature of the room based on a schedule determined by the learning module 408. As may be appreciated, the learning module 408 may adjust the temperature using a minimal amount of power. In other embodiments, the learning module 408 may control any suitable appliance based on a location of a person within a building (e.g., lighting appliance, temperature controlling appliance, information handling devices 102, music related appliance, television). It should be noted that the person in the above examples may be any detected person and/or the learned behavior may be specific to the person that is detected.

In one embodiment, the usage history detection module 602 detects, by use of a processor (e.g., the processor 202, the processor 302), a usage history of multiple types of appliances (e.g., a first appliance type 112, a second appliance type 114, a third appliance type 116) in a building. In certain embodiments, the usage history detection module 602 detects the usage history of the multiple types of appliances in the building by receiving data from each type of appliance of the multiple types of appliances. In some embodiments, the usage history detection module 602 receives data from each type of appliance by receiving data from an appliance including power on data, power off data, energy consumption data, settings data, zone operational data, and/or temperature data. As may be appreciated, the usage history may include any suitable data from an appliance.

In various embodiments, the usage history detection module 602 detects the usage history of the multiple types of appliances by detecting the usage history of types of appliances such as a refrigerator, an air conditioner, a heater, a water heater, a lighting fixture, an irrigation system, a microwave, an oven, a stove, a dishwasher, a washing machine, a dryer, a garage door opener, a television, a computer, a fan (e.g., ceiling fan), a thermostat, a door lock, a sound system, an intercom, and/or a small kitchen appliance (e.g., toaster, blender, mixer, coffee maker, crock pot, etc.).

In some embodiments, the usage history detection module 602 may detect the usage history of the multiple types of appliances by requesting data from the multiple types of appliances. In various embodiments, the usage history detection module 602 may detect the usage history of the multiple types of appliances by the multiple types of appliances sending data to the usage history detection module 602 at predetermined intervals and/or on demand (e.g., at any time) by the multiple types of appliances.

In some embodiments, the change determination module 604 determines changes to operation of the multiple types of appliances based on the usage history. In certain embodiments, the change determination module 604 determines the changes to the operation of the multiple types of appliances based on the usage history by determining to perform functions such as turning on an appliance, turning off an appliance, turning on a subassembly of an appliance, turning off a subassembly of an appliance, adjusting a temperature of an appliance, adjusting a setting of an appliance, and adjusting an amount of power used by an appliance.

In one embodiment, the change determination module 604 determines the changes to the operation of the multiple types of appliances based on the usage history to reduce energy consumption. In certain embodiments, the change determination module 604 determines the changes to the operation of the multiple types of appliances based on user preferences. In various embodiments, the change determination module 604 uses an energy rate schedule to determine the changes to the operation of the multiple types of appliances. In some embodiments, the change determination module 604 dynamically obtains the energy rate schedule, such as from a utility company and/or by accessing a network.

In certain embodiments, the operational control module 606 controls the multiple types of appliances based on the determined changes to the operation of the multiple types of appliances. In various embodiments, the operational control module 606 controls the multiple types of appliances by directing the multiple types of appliances (e.g., transmitting or sending information to the appliances) to perform functions such as turning on an appliance, turning off an appliance, turning on a subassembly of an appliance, turning off a subassembly of an appliance, adjusting a temperature of an appliance, adjusting a setting of an appliance, and adjusting an amount of power used by an appliance.

In various embodiments, the sensor module 608 is used to sense and/or detect information that may be used in conjunction with the usage history. In one embodiment, the sensor module 608 detects a number of people in the building and the change determination module 604 determines a correlation between the usage history of the multiple types of appliances in the building and the number of people in the building. In such embodiments, the change determination module 604 determines the changes to the operation of the multiple types of appliances based on the correlation between the usage history of the multiple types of appliances in the building and the number of people in the building.

In some embodiments, the sensor module 608 detects locations of people in the building and the change determination module 604 determines a correlation between the usage history of the multiple types of appliances in the building and the locations of the people in the building. In such embodiments, the change determination module 604 determines the changes to the operation of the multiple types of appliances based on the correlation between the usage history of the multiple types of appliances in the building and the locations of the people in the building. In certain embodiments, the sensor module 608 includes at least one sensor used to detect the locations of the people in the building. In such embodiments, the sensor may include a motion detector, a camera, a mobile phone, an activity tracker, and/or an information handling device.

In various embodiments, the sensor module 608 detects an environmental factor associated with a person in the building and the change determination module 604 determines the changes to the operation of the multiple type of appliances based on the environmental factor. In such embodiments, the sensor module 608 detects the environmental factor associated with the person by detecting a temperature associated with the person. In certain embodiments, the sensor module 608 detects the temperature associated with the person by receiving data from an information handling device worn by the person. In some embodiments, the sensor module 608 detects the temperature associated with the person by receiving data from an information handling device that detects ambient temperature and/or from an information handling device that detects an outside temperature. In certain embodiments, the sensor module 608 detects the environmental factor using any suitable sensor, such as a temperature sensor, a monitor, a detector, and so forth.

Figure 7:
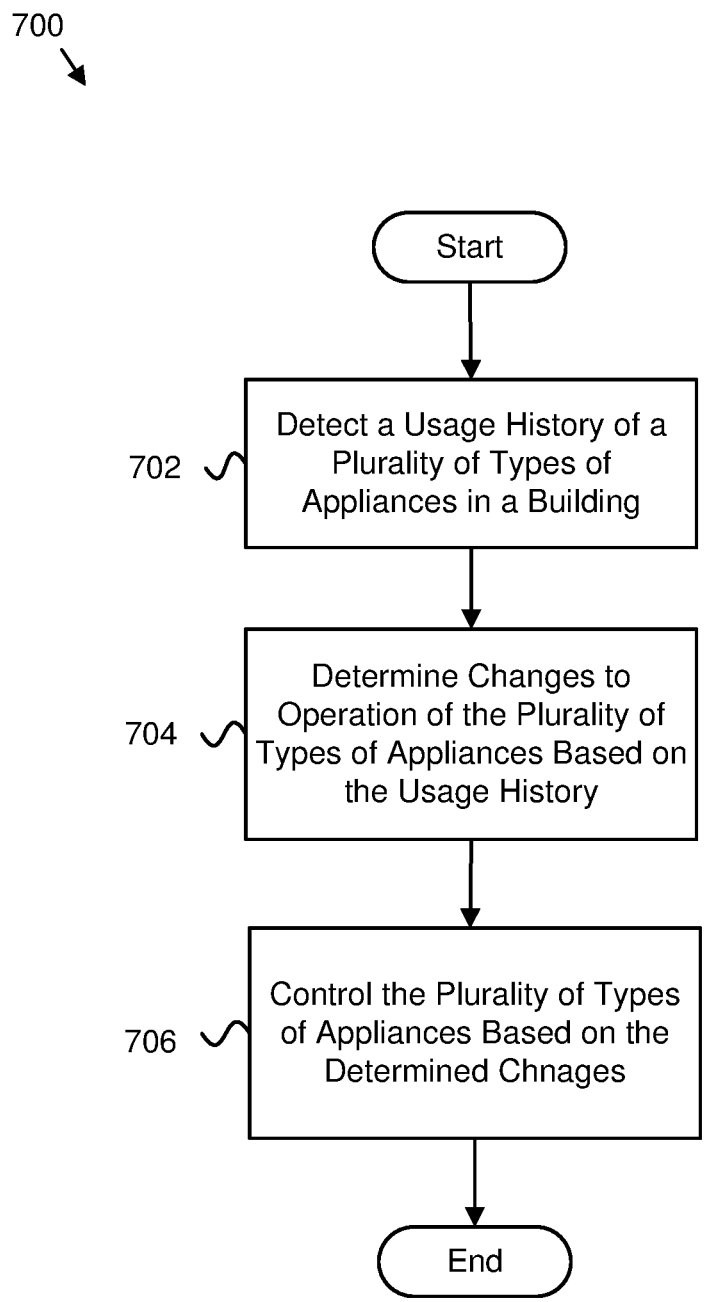
FIG. 7 is a schematic flow chart diagram illustrating an embodiment of a method for controlling appliances.

FIG. 7 is a schematic flow chart diagram illustrating an embodiment of a method 700 for controlling appliances. In some embodiments, the method 700 is performed by an apparatus, such as the information handling device 102. In other embodiments, the method 700 may be performed by a module, such as the learning module 408. In certain embodiments, the method 700 may be performed by a processor executing program code, for example, a microcontroller, a microprocessor, a CPU, a GPU, an auxiliary processing unit, a FPGA, or the like.

The method 700 may include detecting 702, by use of a processor (e.g., a processor 202, a processor 302), a usage history of multiple types of appliances (e.g., a first appliance type 112, a second appliance type 114, a third appliance type 116) in a building. In certain embodiments, the usage history detection module 602 may detect 702 the usage history of the multiple types of appliances in the building. In some embodiments, detecting 702 the usage history of the multiple types of appliances in the building includes receiving data from each type of appliance of the multiple types of appliances. In such embodiments, receiving data from each type of appliance includes receiving data including power on data, power off data, energy consumption data, settings data, zone operational data, and/or temperature data.

In various embodiments, detecting 702 the usage history of the multiple types of appliances includes detecting the usage history of types of appliances including a refrigerator, an air conditioner, a heater, a water heater, a lighting fixture, an irrigation system, a microwave, an oven, a stove, a dishwasher, a washing machine, a dryer, a garage door opener, a television, a computer, a fan (e.g., ceiling fan), a thermostat, a door lock, a sound system, an intercom, and/or a small kitchen appliance (e.g., toaster, blender, mixer, coffee maker, crock pot, etc.).

The method 700 may also include determining 704 changes to operation of the multiple types of appliances based on the usage history. In certain embodiments, the change determination module 604 may determine 704 changes to the operation of the multiple types of appliances based on the usage history.

In one embodiment, determining 704 the changes to the operation of the multiple types of appliances based on the usage history includes determining to perform functions including turning on an appliance, turning off an appliance, turning on a subassembly of an appliance, turning off a subassembly of an appliance, adjusting a temperature controlled by an appliance, adjusting a setting of an appliance, and/or adjusting an amount of power used by an appliance. In some embodiments, determining 704 the changes to the operation of the multiple types of appliances based on the usage history includes determining the changes to the operation of the multiple types of appliances based on the usage history to reduce energy consumption.

In one embodiment, determining 704 the changes to the operation of the multiple types of appliances based on the usage history includes determining the changes to the operation of the multiple types of appliances based on user preferences. In some embodiments, determining 704 the changes to the operation of the multiple types of appliances based on the usage history includes using an energy rate schedule to determine the changes to the operation of the multiple types of appliances. In such embodiments, the method 700 may include dynamically obtaining the energy rate schedule.

The method 700 may include controlling 706 the multiple types of appliances based on the determined changes to the operation of the multiple types of appliances, and the method 700 may end. In one embodiment, the operational control module 606 may control 706 the multiple types of appliances based on the determined changes to the operation of the multiple types of appliances.

In some embodiments, controlling 706 the multiple types of appliances based on the determined changes to the operation of the multiple types of appliances includes directing the multiple types of appliances to perform functions including turning on an appliance, turning off an appliance, turning on a subassembly of an appliance, turning off a subassembly of an appliance, adjusting a temperature of an appliance, adjusting a setting of an appliance, and/or adjusting an amount of power used by an appliance.

In one embodiment, the method 700 may include detecting a number of people in the building and determining a correlation between the usage history of the multiple types of appliances in the building and the number of people in the building. In such an embodiment, determining 704 the changes to the operation of the multiple types of appliances based on the usage history includes determining the changes to the operation of the multiple types of appliances based on the correlation between the usage history of the multiple types of appliances in the building and the number of people in the building.

In certain embodiments, the method 700 may include detecting locations of people in the building and determining a correlation between the usage history of the multiple types of appliances in the building and the locations of the people in the building. In such embodiments, determining 704 the changes to the operation of the multiple types of appliances based on the usage history includes determining the changes to the operation of the multiple types of appliances based on the correlation between the usage history of the multiple types of appliances in the building and the locations of the people in the building. In certain embodiments, detecting the locations of the people in the building includes detecting the locations of the people in the building using at least one sensor including a motion detector, a camera, a mobile phone, an activity tracker, and/or an information handling device.

In some embodiments, the method 700 includes detecting an environmental factor associated with a person in the building and determining the changes to the operation of the multiple type of appliances based on the environmental factor. In such embodiments, detecting the environmental factor associated with the person includes detecting a temperature associated with the person. In certain embodiments, detecting the temperature associated with the person includes detecting the temperature associated with the person by receiving data from an information handling device worn by the person. In some embodiments, detecting the temperature associated with the person includes receiving data from an information handling device that detects ambient temperature and/or from an information handling device that detects an outside temperature.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
detect a first usage history of a first plurality of appliances in a first building that is occupied and a second usage history of a second plurality of appliances in a second building that is unoccupied;
detect, using a mobile phone of a person in the first building, movement of the person toward a room in the first building;
determine changes to operation of first appliances of the first plurality of appliances that are in the first building based on the first usage history of the first plurality of appliances in the first building and the movement of the person toward the room in the first building, wherein the changes to operation of the first appliances comprises a first change to a first appliance that adjusts a temperature of the room;
determine changes to operation of second appliances of the second plurality of appliances that are in the second building based on the second usage history of the second plurality of appliances in the second building and the second building being unoccupied, wherein the changes to operation of the second appliances comprises a second change to a second appliance that adjusts a temperature of the second building, a third change to a refrigerator of the second building, and a fourth change to a water heater of the second building;
control the first appliances of the first plurality of appliances based on the determined changes to the operation of the first appliances of the first plurality of appliances to adjust the temperature of the room in response to detecting movement of the person toward the room, wherein the first appliances are controlled by transmitting control data via a cellular back channel, and the cellular back channel operates below a predetermined bandwidth, operates during predetermined time periods, or a combination thereof; and
control the second appliances of the second plurality of appliances based on the determined changes to the operation of the second appliances of the second plurality of appliances, wherein the first appliances and the second appliances are controlled synchronously.

2. The apparatus of claim 1, wherein the code executable by the processor detects the first usage history of the first plurality of appliances in the first building by receiving data from each appliance of the first plurality of appliances.

3. The apparatus of claim 1, wherein the code executable by the processor determines the changes to the operation of the first appliances of the first plurality of appliances based on the first usage history to reduce energy consumption.

4. The apparatus of claim 1, wherein the code executable by the processor determines the changes to the operation of the first appliances of the first plurality of appliances based on user preferences.

5. The apparatus of claim 1, wherein the code executable by the processor detects a number of people in the first building and determines a correlation between the first usage history of the first appliances of the first plurality of appliances in the first building and the number of people in the first building.

6. A method comprising:
detecting, by use of a processor, a first usage history of a first plurality of appliances in a first building that is occupied and a second usage history of a second plurality of appliances in a second building that is unoccupied;
detecting, using a mobile phone of a person in the first building, movement of the person toward a room in the first building;
determining changes to operation of first appliances of the first plurality of appliances that are in the first building based on the first usage history of the first plurality of appliances in the first building and the movement of the person toward the room in the first building, wherein the changes to operation of the first appliances comprises a first change to a first appliance that adjusts a temperature of the room;
determining changes to operation of second appliances of the second plurality of appliances that are in the second building based on the second usage history of the second plurality of appliances in the second building and the second building being unoccupied, wherein the changes to operation of the second appliances comprises a second change to a second appliance that adjusts a temperature of the second building, a third change to a refrigerator of the second building, and a fourth change to a water heater of the second building;
controlling the first appliances of the first plurality of appliances based on the determined changes to the operation of the first appliances of the first plurality of appliances to adjust the temperature of the room in response to detecting movement of the person toward the room, wherein the first appliances are controlled by transmitting control data via a cellular back channel, and the cellular back channel operates below a predetermined bandwidth, operates during predetermined time periods, or a combination thereof; and
controlling the second appliances of the second plurality of appliances based on the determined changes to the operation of the second appliances of the second plurality of appliances, wherein the first appliances and the second appliances are controlled synchronously.

7. The method of claim 6, wherein detecting the first usage history of the first plurality of appliances in the first building comprises receiving data from each appliance of the first plurality of appliances.

8. The method of claim 7, wherein receiving data from each appliance comprises receiving data selected from the group comprising power on data, power off data, energy consumption data, settings data, zone operational data, and temperature data.

9. The method of claim 6, wherein detecting the first usage history of the first plurality of appliances comprises detecting the first usage history of appliances selected from the group consisting of a refrigerator, an air conditioner, a heater, a water heater, a lighting fixture, an irrigation system, a microwave, an oven, a stove, a dishwasher, a washing machine, a dryer, a garage door opener, a television, a computer, and a kitchen appliance.

10. The method of claim 6, wherein determining the changes to the operation of the first appliances of the first plurality of appliances based on the first usage history comprises determining to perform functions selected from the group consisting of turning on, turning off, turning on a subassembly, turning off a subassembly, adjusting a temperature, adjusting a setting, and adjusting an amount of power used.

11. The method of claim 6, wherein determining the changes to the operation of the first appliances of the first plurality of appliances based on the first usage history comprises determining the changes to the operation of the first appliances of the first plurality of appliances based on the first usage history to reduce energy consumption.

12. The method of claim 6, wherein determining the changes to the operation of the first appliances of the first plurality of appliances based on the first usage history comprises determining the changes to the operation of the first appliances of the first plurality of appliances based on user preferences.

13. The method of claim 6, wherein determining the changes to the operation of the first appliances of the first plurality of appliances based on the first usage history comprises using an energy rate schedule to determine the changes to the operation of the first appliances of the first plurality of appliances.

14. The method of claim 13, further comprising dynamically obtaining the energy rate schedule.

15. The method of claim 6, wherein controlling the first appliances of the first plurality of appliances based on the determined changes to the operation of the first appliances of the first plurality of appliances comprises directing the first appliances of the first plurality of appliances to perform functions selected from the group consisting of turning on, turning off, turning on a subassembly, turning off a subassembly, adjusting a temperature, adjusting a setting, and adjusting an amount of power used.

16. The method of claim 6, further comprising detecting a number of people in the first building and determining a correlation between the first usage history of the first plurality of appliances in the first building and the number of people in the first building.

17. The method of claim 16, wherein determining the changes to the operation of the first appliances of the first plurality of appliances based on the first usage history comprises determining the changes to the operation of the first appliances of the first plurality of appliances based on the correlation between the first usage history of the first plurality of appliances in the first building and the number of people in the first building.

18. The method of claim 6, further comprising detecting locations of people in the first building and determining a correlation between the first usage history of the first plurality of appliances in the first building and the locations of the people in the first building.

19. The method of claim 18, wherein determining the changes to the operation of the first appliances of the first plurality of appliances based on the first usage history comprises determining the changes to the operation of the first appliances of the first plurality of appliances based on the correlation between the first usage history of the first plurality of appliances in the first building and the locations of the people in the first building.

20. The method of claim 18, wherein detecting the locations of the people in the first building comprises detecting the locations of the people in the first building using at least one sensor selected from the group consisting of a motion detector, a camera, a mobile phone, an activity tracker, and an information handling device.

21. The method of claim 6, further comprising detecting an environmental factor associated with a person in the first building and determining the changes to the operation of the first appliances of the first plurality of appliances based on the environmental factor.

22. The method of claim 21, wherein detecting the environmental factor associated with the person comprises detecting a temperature associated with the person.

23. The method of claim 22, wherein detecting the temperature associated with the person comprises detecting the temperature associated with the person by receiving data from an information handling device worn by the person.

24. A program product comprising a non-transitory computer readable storage medium that stores code executable by a processor, the executable code comprising code to perform:
   detecting a first usage history of a first plurality of appliances in a first building that is occupied and a second usage history of a second plurality of appliances in a second building that is unoccupied;
   detecting, using a mobile phone of a person in the first building, movement of the person toward a room in the first building;
   determining changes to operation of first appliances of the first plurality of appliances that are in the first building based on the first usage history of the first plurality of appliances in the first building and the movement of the person toward the room in the first building, wherein the changes to operation of the first appliances comprises a first change to a first appliance that adjusts a temperature of the room;
   determining changes to operation of second appliances of the second plurality of appliances that are in the second building based on the second usage history of the second plurality of appliances in the second building and the second building being unoccupied, wherein the changes to operation of the second appliances comprises a second change to a second appliance that adjusts a temperature of the second building, a third change to a refrigerator of the second building, and a fourth change to a water heater of the second building;
   controlling the first appliances of the first plurality of appliances based on the determined changes to the operation of the first appliances of the first plurality of appliances to adjust the temperature of the room in response to detecting movement of the person toward the room, wherein the first appliances are controlled by transmitting control data via a cellular back channel, and the cellular back channel operates below a predetermined bandwidth, operates during predetermined time periods, or a combination thereof; and
   controlling the second appliances of the second plurality of appliances based on the determined changes to the operation of the second appliances of the second plurality of appliances, wherein the first appliances and the second appliances are controlled synchronously.

\* \* \* \* \*